United States Patent
Heise et al.

(10) Patent No.: US 9,568,137 B2
(45) Date of Patent: Feb. 14, 2017

(54) HEATING CABLES

(71) Applicant: Heat-Line Corporation, Carnarvon (CA)

(72) Inventors: Lorne R. Heise, Algonquin Highlands (CA); Chuck H. Myers, Broken Arrow, OK (US)

(73) Assignee: Heat-Line Corporation, Algonquin Highlands (CA)

( * ) Notice: Subject to any disclaimer, the term of this patent is extended or adjusted under 35 U.S.C. 154(b) by 149 days.

(21) Appl. No.: 14/569,168

(22) Filed: Dec. 12, 2014

(65) Prior Publication Data

US 2015/0167885 A1  Jun. 18, 2015

Related U.S. Application Data

(60) Provisional application No. 61/915,335, filed on Dec. 12, 2013.

(51) Int. Cl.
| | |
|---|---|
| *E03B 7/10* | (2006.01) |
| *F16L 53/00* | (2006.01) |
| *H05B 3/56* | (2006.01) |
| *H05B 3/06* | (2006.01) |

(52) U.S. Cl.
CPC ............ *F16L 53/008* (2013.01); *H05B 3/06* (2013.01); *H05B 3/56* (2013.01)

(58) Field of Classification Search
None
See application file for complete search history.

(56) References Cited

U.S. PATENT DOCUMENTS

| | | | | |
|---|---|---|---|---|
| 1,809,714 A | * | 6/1931 | Mathews | F16L 53/008 219/522 |
| 3,378,673 A | * | 4/1968 | Hopper | F16L 53/008 138/149 |
| 3,764,779 A | * | 10/1973 | Kadoya | F16C 1/10 138/33 |
| 4,069,410 A | * | 1/1978 | Keep, Jr. | H05B 3/565 174/109 |
| 4,388,523 A | * | 6/1983 | Keep, Jr. | H05B 3/06 174/77 R |
| 4,501,952 A | * | 2/1985 | Lehrke | B05B 7/22 165/156 |
| 4,553,023 A | * | 11/1985 | Jameson | F16L 53/008 137/341 |
| 4,616,894 A | * | 10/1986 | Baker | H01R 13/005 174/15.7 |
| 5,381,511 A | * | 1/1995 | Bahar | F16L 11/12 138/104 |

(Continued)

*Primary Examiner* — Thor Campbell
(74) *Attorney, Agent, or Firm* — Blake, Cassels & Graydon LLP; John R.S. Orange

(57) ABSTRACT

A heating assembly for use in a fluid line has a heating cable including electrical resistance wires encapsulated in a metal sheath. The cable passes through a fitting where it is connected to a power supply. The connection between the power supply and the heating cable is encapsulated within the fitting, and the metal sheath is secured to the fitting with a permanent connection. A bushing is provided to support the connection between the resistance wires and the power supply within the fitting. The elongate sheath may be inserted into a fluid line and the fitting connected to that line using a mechanical connection.

7 Claims, 3 Drawing Sheets

(56) References Cited

U.S. PATENT DOCUMENTS

| | | | | |
|---|---|---|---|---|
| 5,791,377 | A * | 8/1998 | LaRochelle | B60S 1/488 138/109 |
| 5,933,574 | A * | 8/1999 | Avansino | F16L 53/008 219/535 |
| 6,147,308 | A * | 11/2000 | Santagata | E01B 7/24 174/75 R |
| 6,456,785 | B1 * | 9/2002 | Evans | F24H 1/102 392/448 |
| 6,573,484 | B1 * | 6/2003 | Yue | H01R 4/26 219/541 |
| 6,738,566 | B2 * | 5/2004 | Pagnella | F16L 53/008 219/534 |
| 6,943,319 | B2 * | 9/2005 | Jones | H05B 3/56 174/103 |
| 7,565,065 | B2 * | 7/2009 | Kato | F24H 1/142 392/311 |
| 7,622,677 | B2 * | 11/2009 | Barberree | H01R 9/0524 174/84 C |
| 8,238,733 | B2 * | 8/2012 | Sawada | F16L 53/008 138/33 |
| 8,291,939 | B2 * | 10/2012 | Ferrone | A01K 7/027 138/104 |
| 2015/0240693 | A1 * | 8/2015 | Birman | F01N 3/2066 392/488 |

* cited by examiner

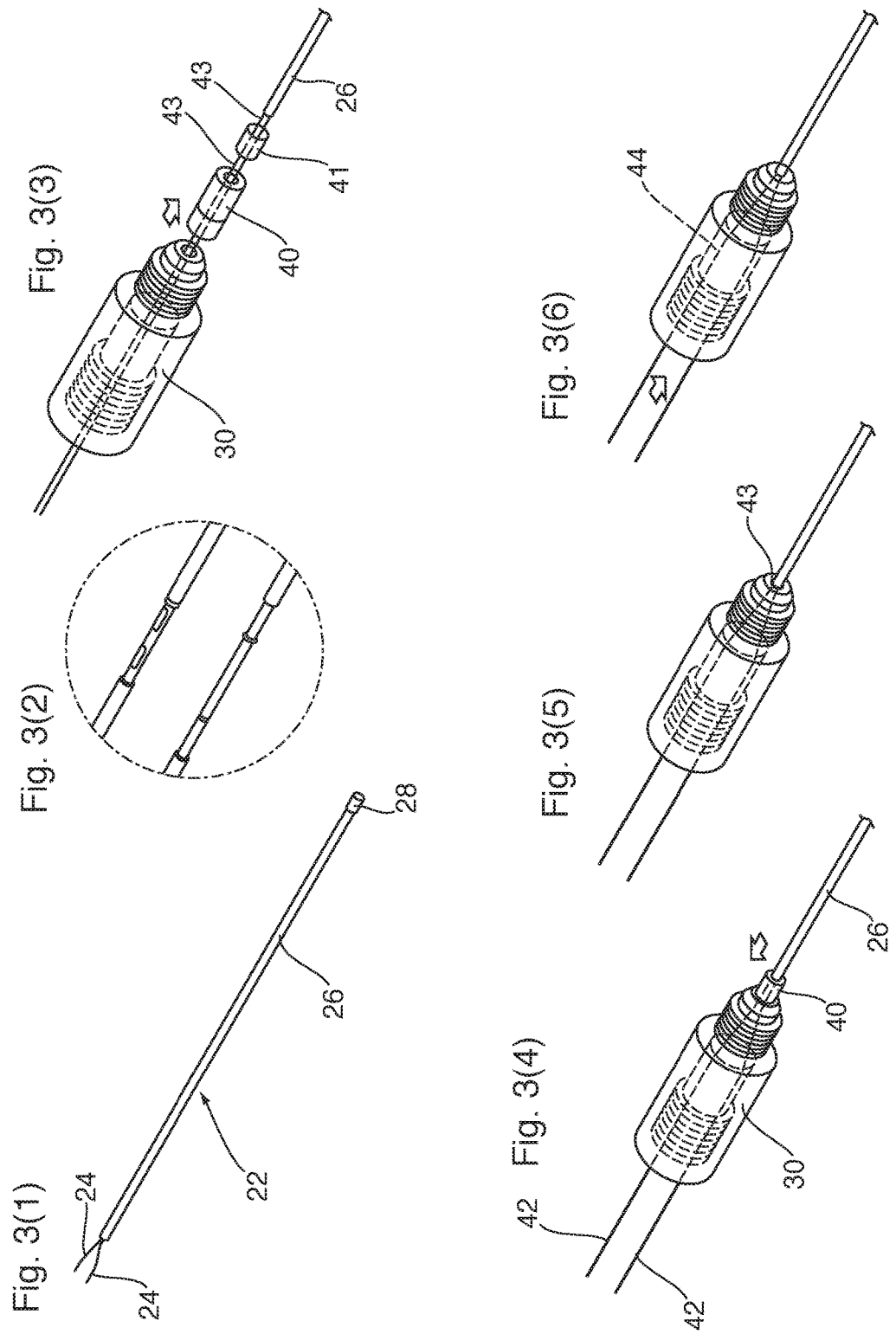

HEATING CABLES

CROSS-REFERENCE TO RELATED APPLICATIONS

This application claims priority to U.S. Provisional Patent Application No. 61/915,335 filed on Dec. 12, 2013, entitled "HEATING CABLES", the entire contents of which is incorporated herein by reference.

FIELD OF THE INVENTION

The present invention relates to heaters for heating fluid lines such as oil lines, hydraulic lines, and the like.

One of the challenges facing the operation of machinery in low temperature environments is the significant increase of viscosity of fluid, such as oil, within the machine when it is left unused. Starting the machine in a cold state may result in starving of the flow of lubricating oils through the machine due to its increased viscosity that may lead to rapid deterioration and failure of the machine.

It is known to provide heating blankets and the like over such machines but these are relatively energy intensive as they are attempting to maintain the whole machine at an elevated temperature, rather than specific areas of the machine.

Mineral filled heating cables have a pair of resistance wires within a metal outer sheath with a mineral powder filling to insulate the wires from the sheath. They can therefore be used to provide localised heating to the exterior of machines, but again this is relatively inefficient due to the heat loss to the surroundings. The cables are also vulnerable when used externally, making their use in arduous conditions difficult.

Self-regulating heating cables, that is heating cables which regulate the current supplied to the heating cable in proportion to the ambient conditions, are used with water supply pipes as a freeze prevention device. The heat loss to the surrounding environment is mitigated and the supply pipe may be insulated if appropriate. Such cables however are intended for low pressure applications and can operate in a relatively restricted temperature range. A maximum operating temperature of 185° F. is typical for such cables, which is too low for many machinery applications.

Mineral insulated heating cables are capable of operating temperatures up to 1000° F. are mechanically robust enough to withstand elevated operating pressures. However, when used with low voltage sources, such as those typically found in mobile machinery applications, the resistance wires are of very small diameter and therefore fragile, requiring protection if they are to be used in the robust operating conditions required for many machine applications.

It is therefore an object of the present invention to obviate or mitigate the above disadvantages.

SUMMARY OF THE INVENTION

According to the present invention there is provided a heating cable for use in a fluid line including electrical resistance wires encapsulated in a metal sheath. The cable passes through a fitting where it is connected to a power supply. The connection between the power supply and the heating cable is encapsulated within the fitting, and the metal sheath is secured to the fitting with a permanent connection. The elongate sheath may be inserted into a fluid line and the fitting connected to that line using a mechanical connection.

BRIEF DESCRIPTION OF THE DRAWINGS

Embodiments of the invention will now be described by way of example only with reference to the accompanying drawings in which:

FIG. 3 is a schematic representation of the assembly of the components of the heating cable shown in FIG. 2.

Figure 1:
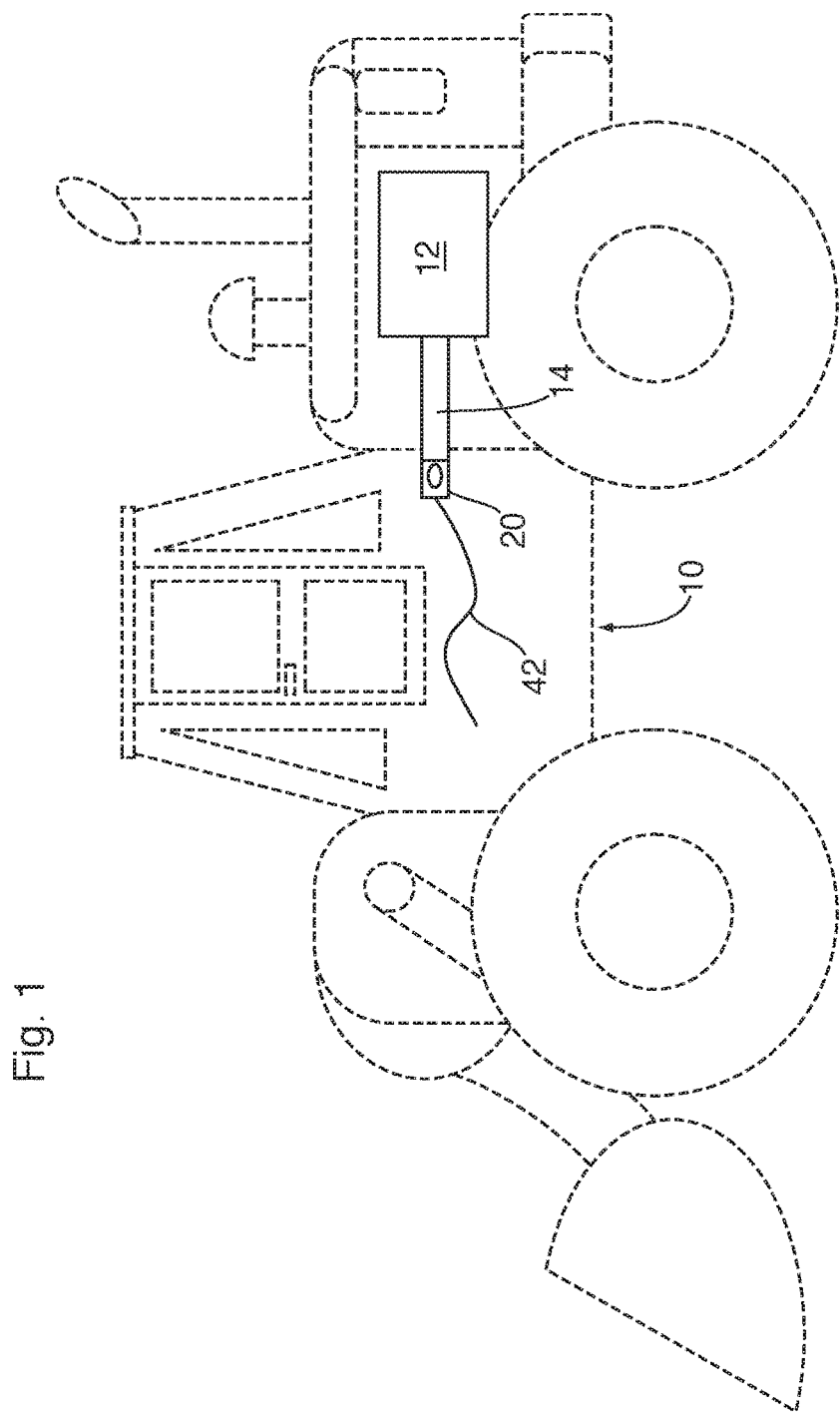
FIG. 1 is a schematic representation of an earth moving machine.

Referring therefore to FIG. 1, an earth moving machine 10 has an engine 12 and an oil supply conduit 14 that runs external of the vehicle. The oil conduit 14 may convey oil from a reservoir to the engine or to a pump driven by the engine, and may be either a flexible conduit or a rigid metal conduit depending upon the particular application. To avoid an unacceptable increase in the viscosity of oil carried by conduit 12, a heater assembly 20 is inserted into the conduit 14 to maintain the fluid at an elevated temperature.

Figure 2:
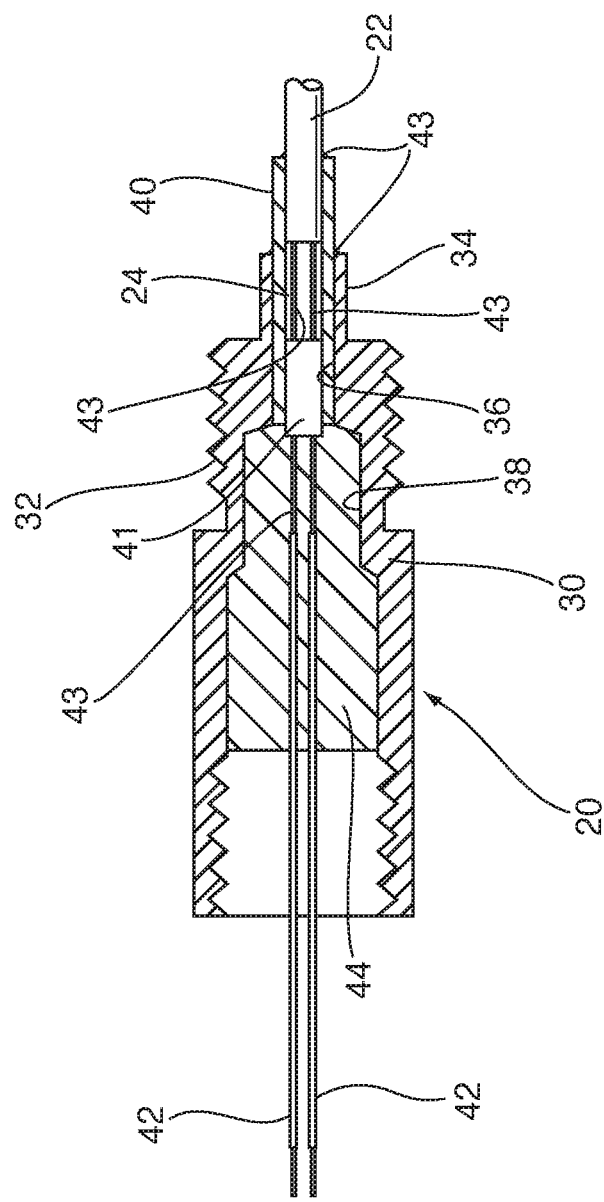
FIG. 2 is a section on the line II-II of FIG. 1.

The heater assembly 20 may be seen in greater detail in FIGS. 2 and 3. The heater assembly 20 includes a heating cable 22 that has a pair of heater wires 24 and an outer steel sheath 26. An insulating powder, such as magnesium oxide is located in the sheath 26 to prevent contact between the wires and the sheath. The end of the tube 26 is sealed with an end seal 28 to inhibit ingress of oil within the tube 26. The sheath 26 is malleable so it may adapt to the configuration of the conduit 12. Typically, the sheath 26 is made from stainless steel or a material with similar physical properties.

The heater assembly 20 includes a fitting 30 having an external threaded boss 32 which conveniently is of a standard pipe thread form such as a JIC Fitting. The boss 32 has an extended nose 34 with a pilot hole 36 extending along the axis of the fitting through the nose 34. The pilot hole extends into a counter bore 38 in the fitting 30.

The pilot hole 36 is dimensioned to receive an annular bushing 40 whose internal diameter corresponds to the external diameter of the metal sheath 26. A spacer 41 is located in the bushing 40 adjacent the counter bore 38 to provide a void between the sheath 26 and the spacer. Intermediate wires 43 extend through and to both sides of the spacer 41 and are connected in the void to the wires 24 of the heater cable 22. The wires 43 are connected on the opposite side to power supply wires 42. It is convenient for the spacer 41 to be formed from a short section of mineral insulated heating cable having larger diameter wires than the wires 24 of the cable 22.

As can be best seen in FIG. 3, the heater assembly 20 is assembled by initially connecting the wires 42 to the heater wires 24 by crimping to the wires 43 on either side of the spacer 41. The bushing 40 is slid on to the sheath 26 and positioned over the splice between the wires 43 and 24. In this position, as seen in FIG. 2, the sheath 26 and spacer 41 is located within the bushing 40, with the connection of the wires 43 to the power supply line outside the bushing 40. The fitting 30 is then slid over the wires 42 until the bushing 40 is located in the pilot hole 36 with the spacer 41 adjacent to the counterbore 38. In this position, the connection of the wires 43 to the power cable 42 is within the counterbore 38. The bushing 40 is silver soldered or welded to the nose 34 and also silver soldered or welded to the sheathing 26 to provide a permanent connection between the fitting and the sheathing.

With the sheathing 26 secured to the fitting 30, the splices remain in the void and in the counter bore 38. The counterbore 38 is then filled with an epoxy 44 to maintain the heater cables separated and insulated.

To use the heater cable, a threaded fitting, such as a T, is provided in the duct 12. The metal sheath 26 is fed through the access port provided by one branch of the T and along the duct until the fitting 30 can be threaded into the access port. In this configuration, the cable extends along the duct within the hydraulic fluid or oil that will be contained in the duct.

The heater wires 24 are then connected to a low voltage, typically 24 volt power source, to provide energy to the heater cable to maintain the temperature of the oil within the duct.

The use of the spacer 41 permits larger diameter conductors to be used for connection to the power supply 42 and the bushing 40 provides a mechanical support within the fitting 36 for the connection to the resistance wires 24 of the cable 22. The bushing also provides spaced connections for the attachment to the fitting and the sheath, allowing welding or silver soldering to be performed in a convenient manner.

The invention claimed is:

1. A heater assembly for use in a fluid line, said assembly including a fitting for connection to said fluid line, a heating cable secured to said fitting and including an electrical resistance wire encapsulated in a sheath, a power cable to supply electrical power to said resistance wire, a bushing located in a bore in said fitting, said sheath being received in said bushing and a connection between said power cable and said resistance wire being located within said bushing, said bushing being secured to said fitting and to said sheath to establish a connection between said fitting and said sheath, said power cable being connected to said resistance wire through a spacer located in said bushing and spaced from said sheath, said spacer having intermediate wires extending therethrough, with said resistance wires connected to said intermediate wires on one side of said bushing and said power supply connected to said intermediate wires on the opposite side of said spacer.

2. A heater assembly according to claim 1 wherein said connection of said power supply to said intermediate wire is located within said fitting.

3. A heater assembly according to claim 2 wherein said fitting has a counterbore and said connection of said power supply to said intermediate wire is located in said counterbore.

4. A heater assembly according to claim 3 wherein said counterbore is filled with a curable filler to encapsulate said connection.

5. A heater assembly according to claim 1 wherein said intermediate wires are of greater diameter than said resistance wires.

6. A heater assembly according to claim 1 wherein said bushing is connected to said fitting and to said sheath at spaced locations.

7. A heater assembly according to claim 1 wherein said sheath is metal.

* * * * *